United States Patent
Park

(10) Patent No.: US 8,953,824 B2
(45) Date of Patent: Feb. 10, 2015

(54) DISPLAY APPARATUS HAVING OBJECT-ORIENTED 3D SOUND COORDINATE INDICATION

(75) Inventor: Seung-min Park, Seoul (KR)

(73) Assignee: The Korea Development Bank, Seoul (KR)

( * ) Notice: Subject to any disclaimer, the term of this patent is extended or adjusted under 35 U.S.C. 154(b) by 909 days.

(21) Appl. No.: 12/736,201

(22) PCT Filed: Mar. 18, 2009

(86) PCT No.: PCT/KR2009/001365
§ 371 (c)(1),
(2), (4) Date: Sep. 17, 2010

(87) PCT Pub. No.: WO2009/116800
PCT Pub. Date: Sep. 24, 2009

(65) Prior Publication Data
US 2011/0007915 A1    Jan. 13, 2011

(30) Foreign Application Priority Data
Mar. 20, 2008  (KR) .......................... 10-2008-0025826

(51) Int. Cl.
*H04R 5/02* (2006.01)
*H04N 5/60* (2006.01)
(Continued)

(52) U.S. Cl.
CPC *H04N 5/607* (2013.01); *H04S 3/00* (2013.01); *H04N 5/642* (2013.01); *H04S 2400/11* (2013.01); *H04N 21/485* (2013.01); *H04S 2400/05* (2013.01)
USPC ........................................................ 381/306

(58) Field of Classification Search
CPC ... H04S 2400/05; H04S 2400/11; H04S 7/30; H04S 7/40

USPC .................................... 381/27, 306, 333, 388
See application file for complete search history.

(56) References Cited

U.S. PATENT DOCUMENTS 6,829,018 B2 * 12/2004 Lin et al. ........................ 348/738
6,939,012 B2 * 9/2005 Cok et al. ........................ 353/94

(Continued)

FOREIGN PATENT DOCUMENTS

JP    2004187288 A  *  7/2004 ................ H04S 7/00
JP    2007-027846        2/2007

(Continued)

OTHER PUBLICATIONS

International Search Report for corresponding PCT Application No. PCT/KR2009/001365, and English translation thereof, dated Aug. 19, 2009.

*Primary Examiner* — Duc Nguyen
*Assistant Examiner* — Kile Blair
(74) *Attorney, Agent, or Firm* — Flynn, Thiel, Boutell & Tanis, P.C.

(57) ABSTRACT

A display apparatus having an object-oriented 3D sound coordinate indication is disclosed, in which sounds are outputted from a speaker positioned matching with a coordinate of an object in a matrix speaker apparatus formed of a plurality of small size speakers disposed behind a display apparatus in cooperation with an object content displayed on a display apparatus screen. The display apparatus having an object-oriented 3D sound coordinate indication comprises a center channel decoder which receives an audio signal corresponding to a center channel speaker among the audio signals outputted from a decoder of the surround speaker system and separates into sound sources based on an object; a center channel matrix for setting the coordinates of sound sources based on the objects separated by the center channel decoder; a matrix amplifier for amplifying an output sound of a speaker matching with each coordinate value of the sound sources based on the object; and a plurality of speakers which are arranged in a matrix shape behind the display monitor, whereby sounds are outputted through the speakers corresponding to the coordinates of the objects displayed on the display monitor.

2 Claims, 12 Drawing Sheets

Overlay mode

(51) Int. Cl.
*H04S 3/00* (2006.01)
*H04N 5/64* (2006.01)
*H04N 21/485* (2011.01)

(56) References Cited

U.S. PATENT DOCUMENTS

2006/0109988 A1 5/2006 Metcalf
2006/0120534 A1 6/2006 Seo et al.
2007/0025703 A1* 2/2007 Horie .............................. 386/96
2007/0203598 A1 8/2007 Seo et al.

FOREIGN PATENT DOCUMENTS

| | | |
|---|---|---|
| JP | 2007-129511 | 5/2007 |
| JP | 2007-274061 | 10/2007 |
| KR | 10-2004-0034443 | 4/2004 |
| WO | WO 2004/075601 A1 | 9/2004 |

* cited by examiner

Common mode

Overlay mode

DISPLAY APPARATUS HAVING OBJECT-ORIENTED 3D SOUND COORDINATE INDICATION

TECHNICAL FIELD

The present invention relates to a display apparatus having an object-oriented 3D coordinate indication, and in particular to a display apparatus having an object-oriented 3D sound coordinate indication in which sounds are outputted from a speaker positioned matching with a coordinate of an object in a matrix speaker apparatus formed of a plurality of small size speakers disposed behind a display apparatus in cooperation with an object content displayed on a display apparatus screen.

BACKGROUND ART

As life standard advances, a lot of people enjoy watching movies and listening music using a home theater system at home. In order to implement a home theater system, as shown in FIG. 1, front left and right speakers, a sub-woofer, surround back speakers, surround left and right speakers and a center speaker are needed in order to build a surround sound along with a large size screen. Among the above speakers, a center speaker is disposed between the front left and right speakers for emphasizing the flow of sound for thereby achieving a perfect sound image. It is generally sound to output words while being disposed at the same position as the front left and right speakers. In addition, the center speaker is disposed closer to a television set (generally above or below the television set) at the heights of human ears. The center speaker can be called as a key speaker in the system.

The television monitor advances from a CRT to an OLED through LCD and PDP with the helps of a DVD, a HDTV and a digital air system. The screen sizes become larger and larger. When the surround environment is installed in a living room or a room, it is hard to properly arrange speakers. In case of the center speaker, it outputs words which are a lot contained in a movie not as an effect component channel, so the arrangement of the same is very important.

Since the center speaker is configured to clearly output words, a frequency response characteristic of the speaker is very important. The audio frequency AF that a human can hear is 20 through 20,000 Hz. The center frequency of a human voice mainly resides at 10,000 Hz. The person intends to recognize the direction of sound lower with respect to the frequency of below 10,000 Hz, and the direction of sound higher with respect to the frequency of above 10,000 Hz. So, the center speaker should be disposed at the center of the screen, but it is impossible to practically dispose the same at the center of the screen, so it is disposed below or above the television set instead. As a result, the above center speaker is not able to output a perfect sound field. However, in case of a theater, the center speaker can be installed behind the screen, so a perfect sound field effect can be obtained.

As the screen sizes become larger and larger, the center speaker is still disposed in the center of the screen. Even when the person who talks in a movie or something is positioned in the left side or the right side or in the upper side or the lower side, the words of the person in the movie are outputted only from the center of the screen, so it is impossible for a movie viewer to listen to balanced words.

DETAILED DESCRIPTIONS OF THE INVENTION

Technical Problems to be Overcome

Accordingly, it is an object of the present invention to provide a display apparatus having an object-oriented 3D coordinate indication in which a word or a sound of an object such as a person or a thing, which produces words or sound, can be outputted from where an object of a screen is positioned.

It is another object of the present invention to provide a display apparatus having an object-oriented 3D coordinate indication which makes it possible for a movie viewer to listen to a 3D sound with the helps of a far and near effect of sound.

Technical Solutions

To achieve the above objects, in a display apparatus which includes a surround speaker, a player for outputting video images and a display monitor, there is provided a display apparatus having an object-oriented 3D sound coordinate indication which comprises a center channel decoder which receives an audio signal corresponding to a center channel speaker among the audio signals outputted from a decoder of the surround speaker system and separates into sound sources based on an object; a center channel matrix for setting the coordinates of sound sources based on the objects separated by the center channel decoder; a matrix amplifier for amplifying an output sound of a speaker matching with each coordinate value of the sound sources based on the object; and a plurality of speakers which are arranged in a matrix shape behind the display monitor, whereby sounds are outputted through the speakers corresponding to the coordinates of the objects displayed on the display monitor.

Advantageous Effects

In the present invention, since a multi matrix speaker system is used without using a single center speaker, even when the sizes of screens become larger, a larger center speaker is not needed. Since the sounds are outputted only from where a sound source object is positioned on the screen, a dynamic and live-like sound field can be implemented with the helps of a dynamic surround method. The center speaker can be positioned at the heights of movie viewer's ears. A compact size speaker can be installed behind the screen irrespective of the sizes of the screen which becomes larger and larger in recent years. The display apparatus can be made thinner along with a perfect compatibility with a conventional system.

BRIEF DESCRIPTIONS OF THE DRAWINGS

The present invention will become better understood with reference to the accompanying drawings which are given only by way of illustration and thus are not limitative of the present invention, wherein.

BEST MODE FOR CARRYING OUT THE INVENTION

Figure 1:
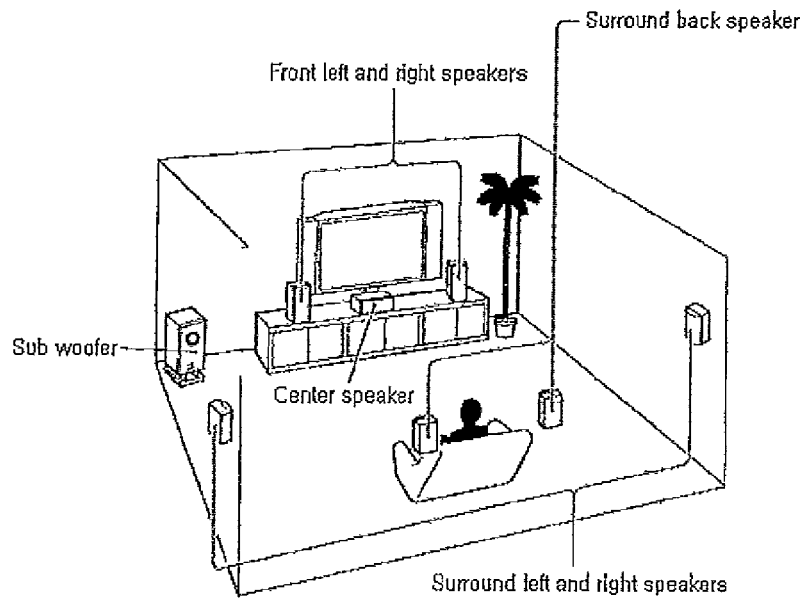
FIG. 1 is a schematic view illustrating a conventional surround speaker system.
Figure 2:
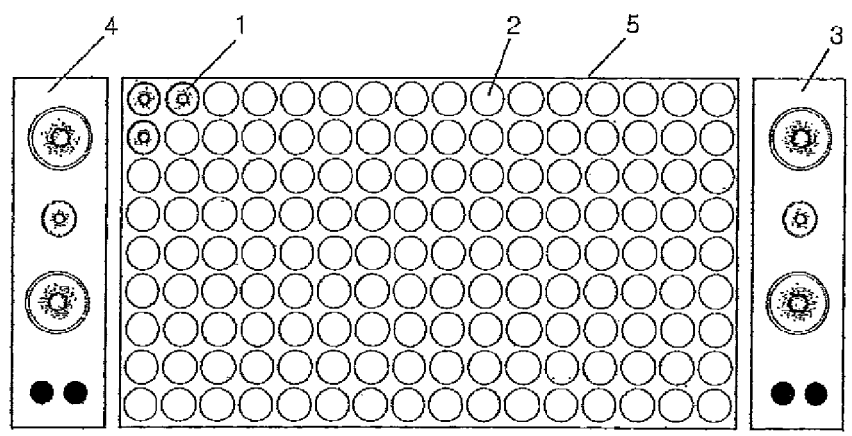
FIGS. 2 through 7 are views illustrating the positions of speakers which can produce sounds depending on the position of a person in a movie which is played in series.
Figure 3:
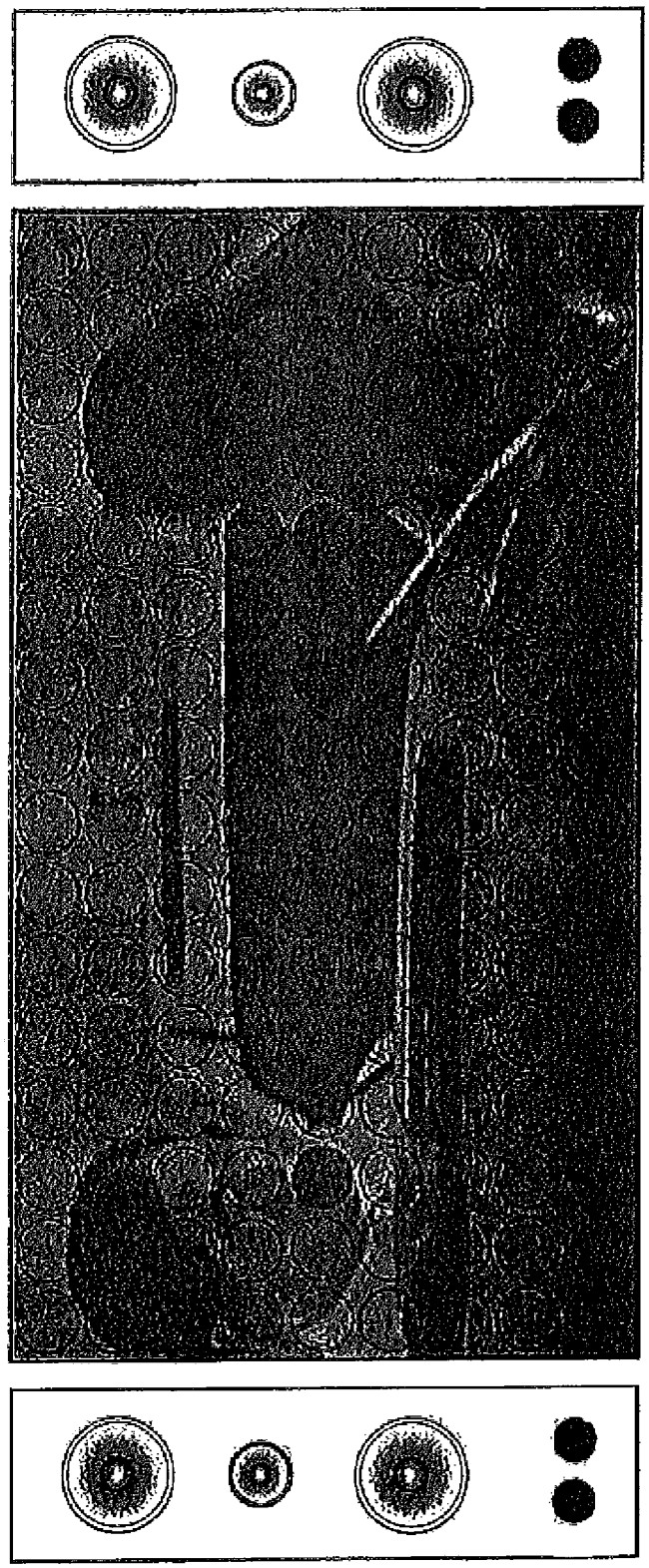
Figure 4:
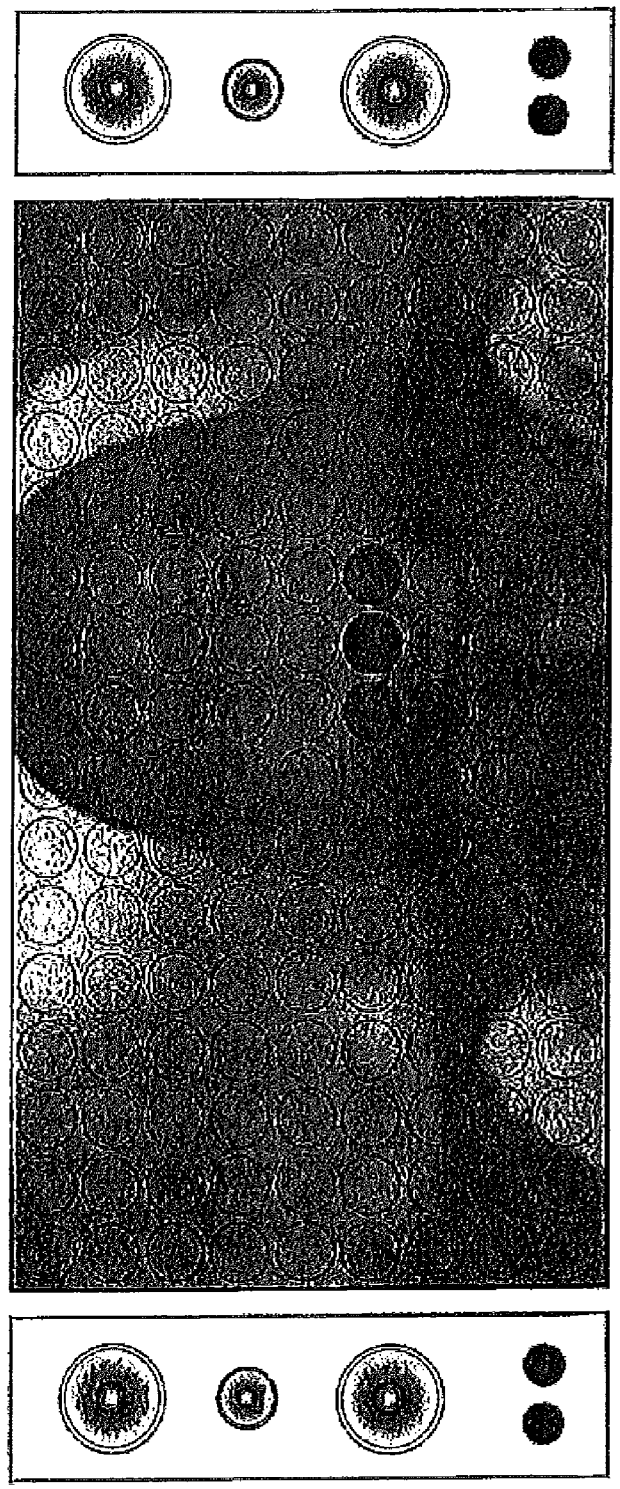
Figure 5:
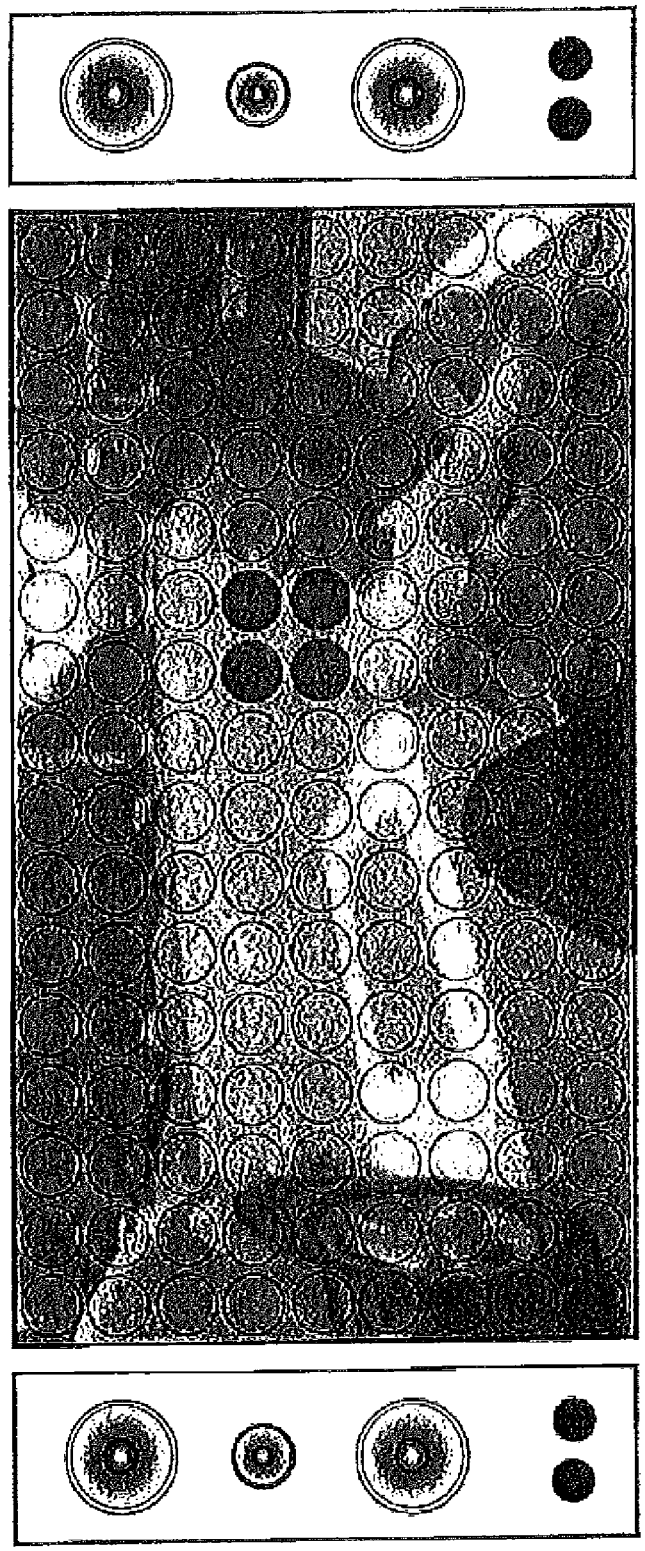
Figure 6:
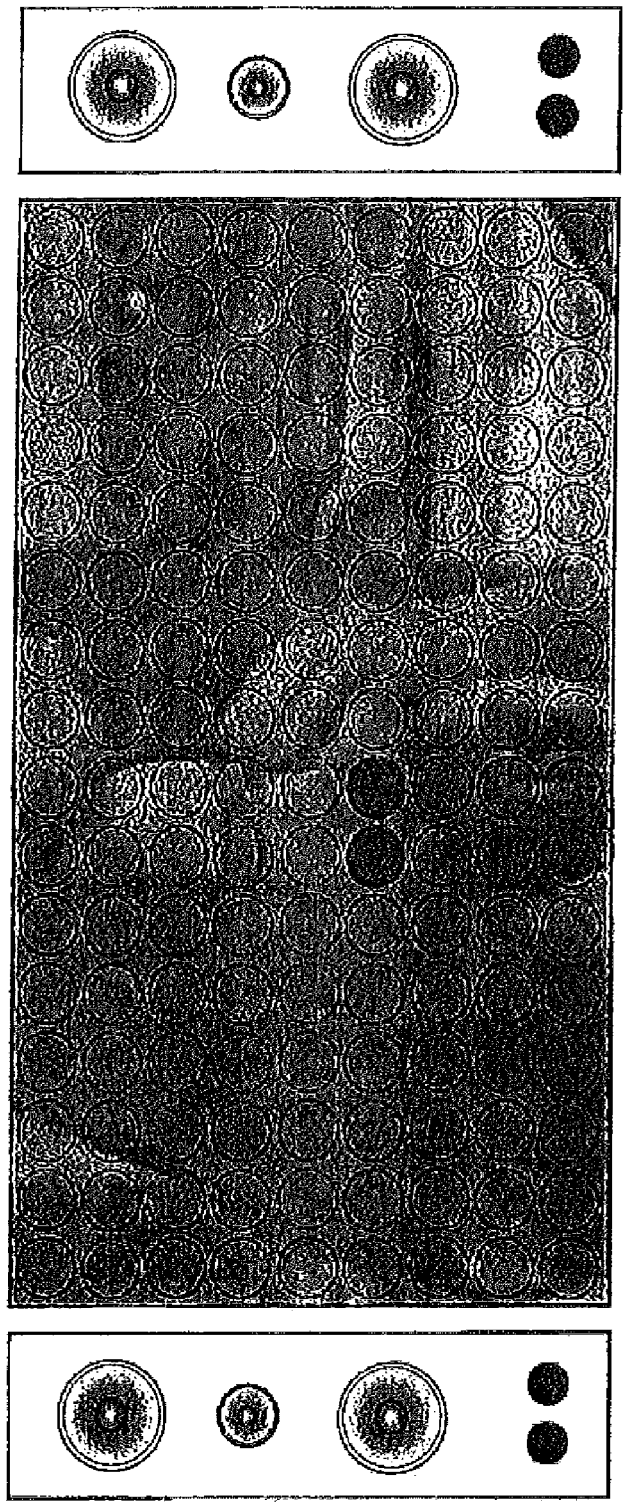
Figure 7:
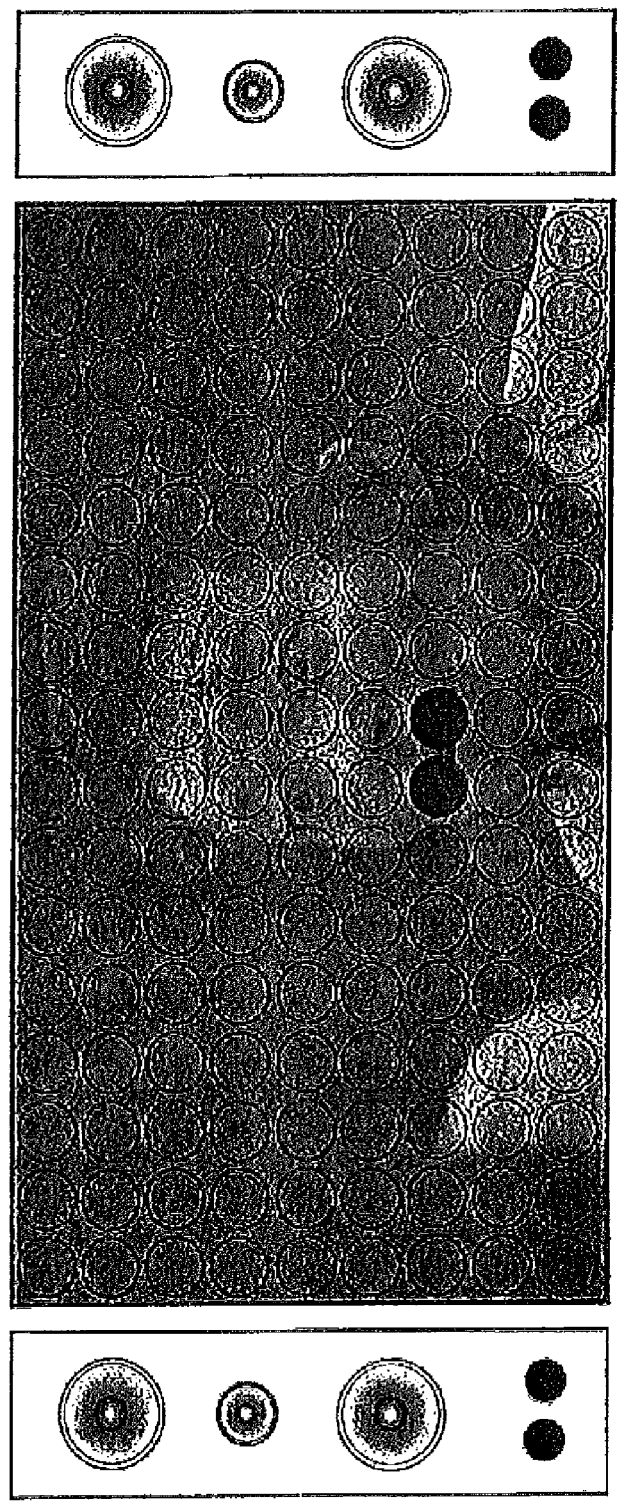

FIG. 2 is a view illustrating an outer construction of an apparatus according to the present invention. A plurality of small size speakers 1 are disposed behind a display monitor 5. A plurality of small holes, which are hardly seen visually, are formed in the display monitor for passing through the sound outputted from the speakers 2. For example, the display monitor might be a LCD, an OLED, a projection or a screen. The speakers 1 and 2 are installed in a matrix type in proper numbers on the axis X and Y of a display monitor. A corresponding speaker can output sounds in sync with the position of an object of a screen. The object might be a person or a thing which produces a sound as it moves on the screen like a motorcycle or something, so that the object can be recognized in a 3D method. The sound outputted from the speakers can be recognized by a movie viewer as a 3D sound with the helps of a position coordinate recognition on the axes X and Y in combination with a remote effect based on the axis Z. Left and right speakers 3 and 4 are arranged at the left and right sides of the display monitor.

FIGS. 3 through 7 are views for describing the present invention by using a scene of a movie "Pounds Beauty, 2006) as an example. The words of the characters are outputted from the speaker where the characters are positioned, so that a movie viewer can enjoy a more practical movie. Here, a corresponding word is outputted from a speaker where a corresponding character is positioned, respectively, when two characters talk words at the same time.

Figure 8:
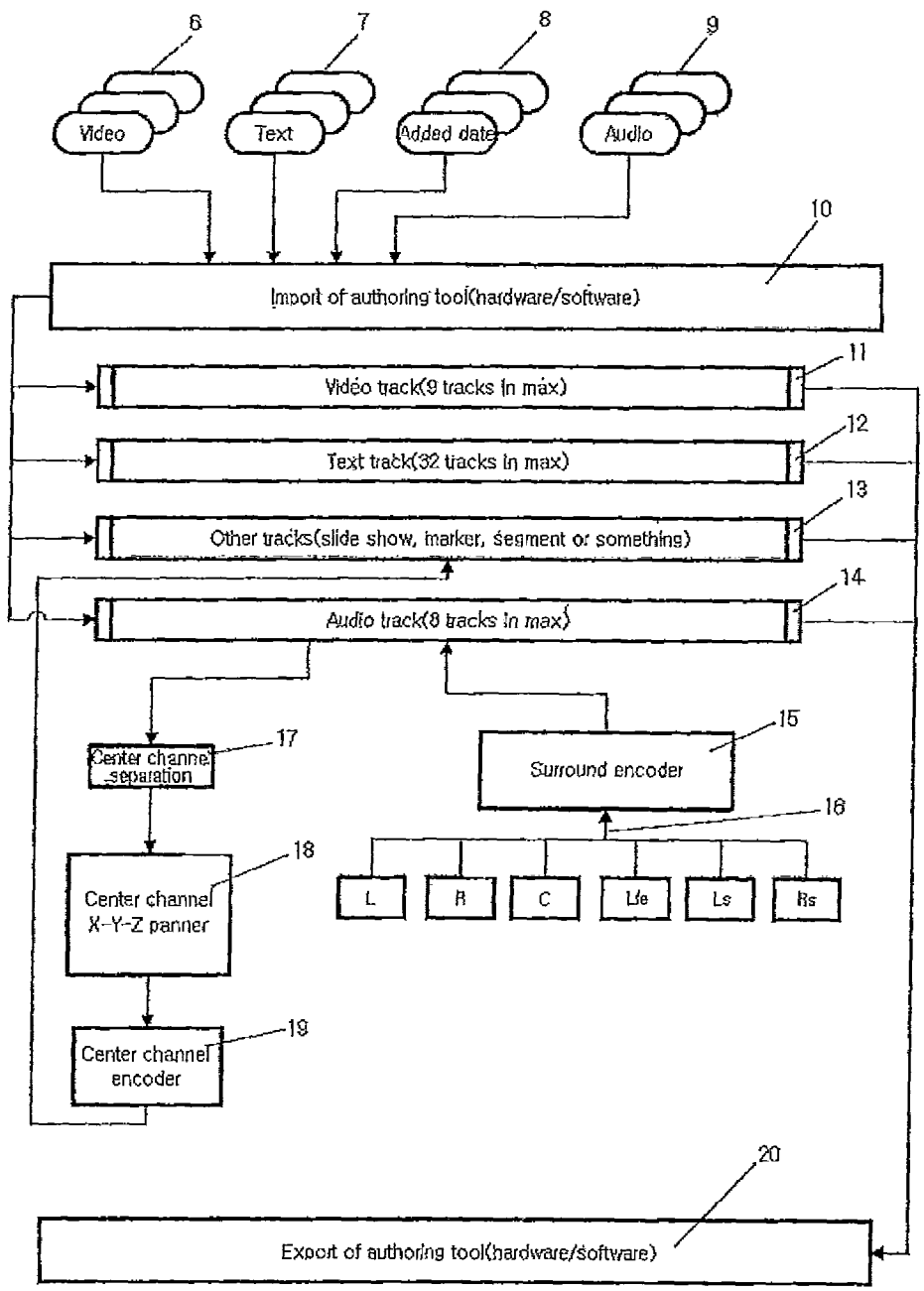
FIG. 8 is a block diagram for describing an apparatus which can produce a recording medium having an object-oriented 3D sound coordinate indication value according to the present invention.

FIG. 8 is a block diagram illustrating a construction of an encoding system of an apparatus according to the present invention. A conventional encoding system needs a center channel encoding system in order to obtain a matrix sound. A center channel is extracted in the course of a surround authoring process, and a center channel position information matching with an image to be displayed is recorded using X-Y-Z coordinate panners, and the data made are stored through a center channel encoder and is recorded in other sub-tracks along with an audio signal of a center channel.

In a conventional surround authoring tool which is used to produce a movie or a DVD title, additional data 8 and audios 9 such as a video 6, a text 7 or something are inputted into a retrieve port 10 of an authoring tool and are separated into a video track 11, a text track 12, other tracks 13 and an audio track 14 and are stored, respectively. The audios for the front left and right speakers, sub-woofer, surround left and right speakers, and surround back speakers are stored in the audio track 14. The sound source of the object is separated from the audio track 14 using a center channel separation panner 17. A center channel position information matching with an object to be displayed is recorded using a center channel X-Y-Z panner 18, and the data including position information is stored into other tracks 13 through a center channel encoder 19. When the audio track has an enough space, the above data can be embedded and stored into the audio track. The encoded data are transmitted to a decoding apparatus through an outgoing port 20 of an authoring tool or are stored into a media recording medium such as a DVD, a blueray, a hard disk or something. The above data can be implemented in a display apparatus having an object-oriented 3D sound coordinate indication.

Figure 9:
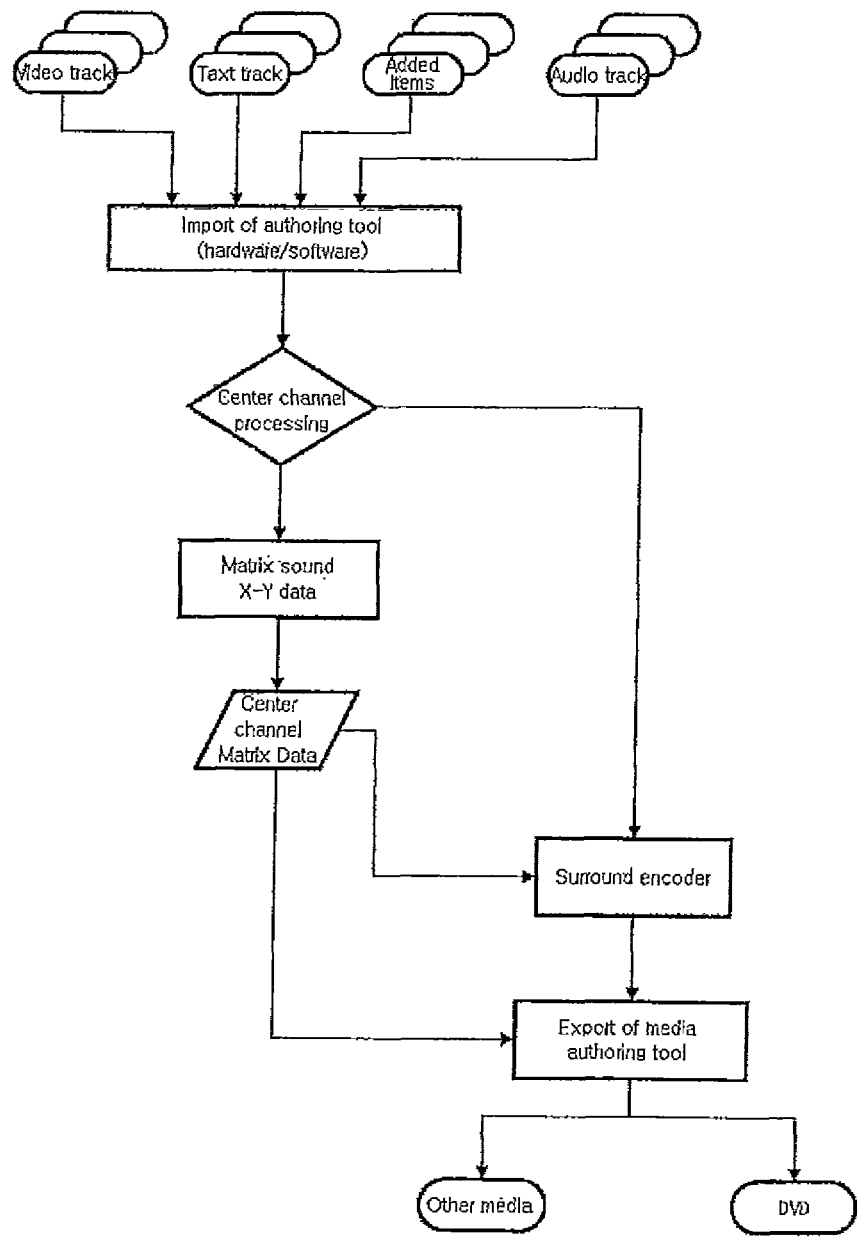
FIG. 9 is a flow chart of a method for producing a recording medium of FIG. 8.

FIG. 9 is a flow chart of an encoding procedure of FIG. 8.

The center channel X-Y-Z coordinate panner provides a common mode and an overlay mode. The common mode can be used when a motion of sound is recognized and when a motion of sound is fixed. In the overlay mode, it is possible to produce a motion of sound while watching a screen to be adapted. Since the center channel coordinate panner is provided in a plug-in type, a user can easily record the position and motion of sound while watching on the screen in the course of authoring procedure. The above work is not complicated since only the work added because of the center channel is performed in the conventional authoring tool.

Figure 10:
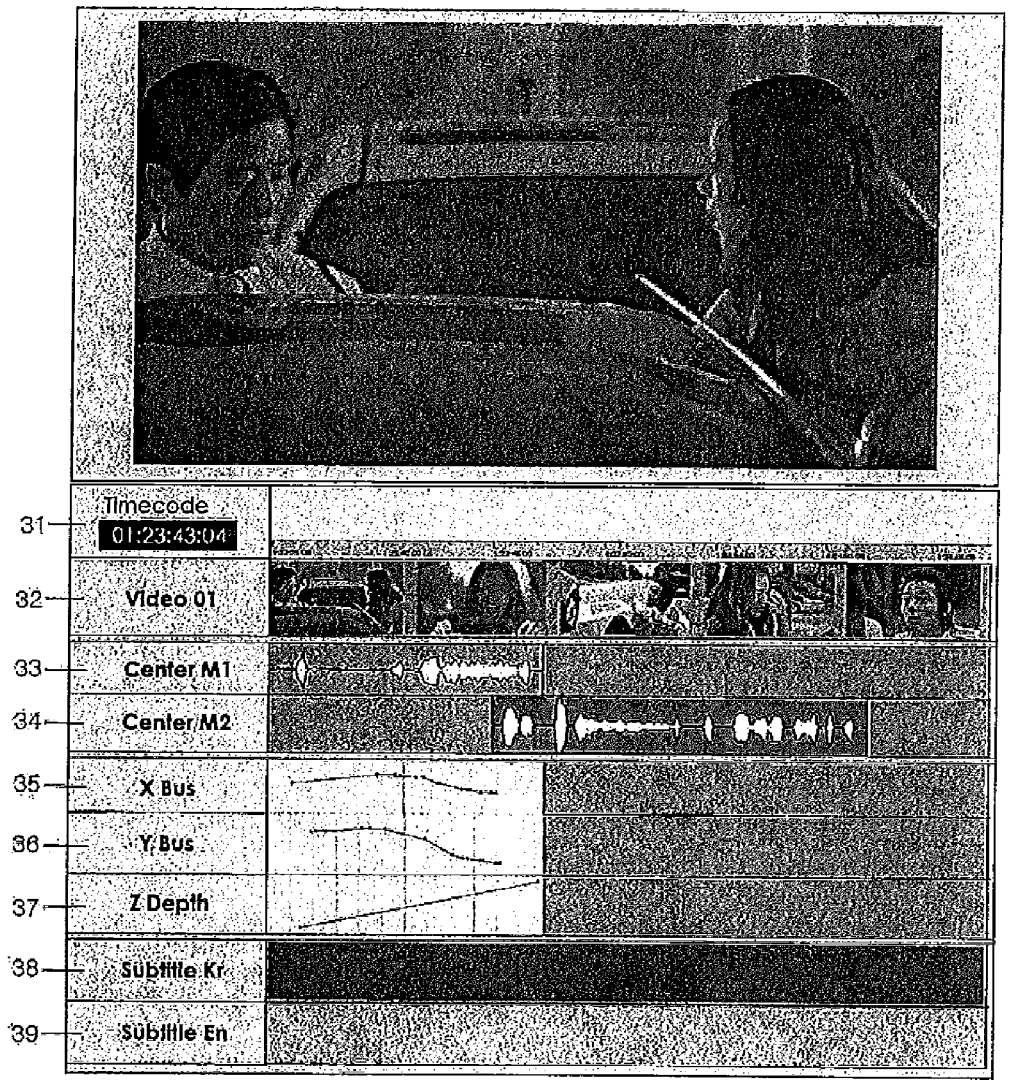
FIG. 10 is a view illustrating an example that a recording medium is stored as a result of work performed in an authoring tool of FIG. 8.
Figure 11:
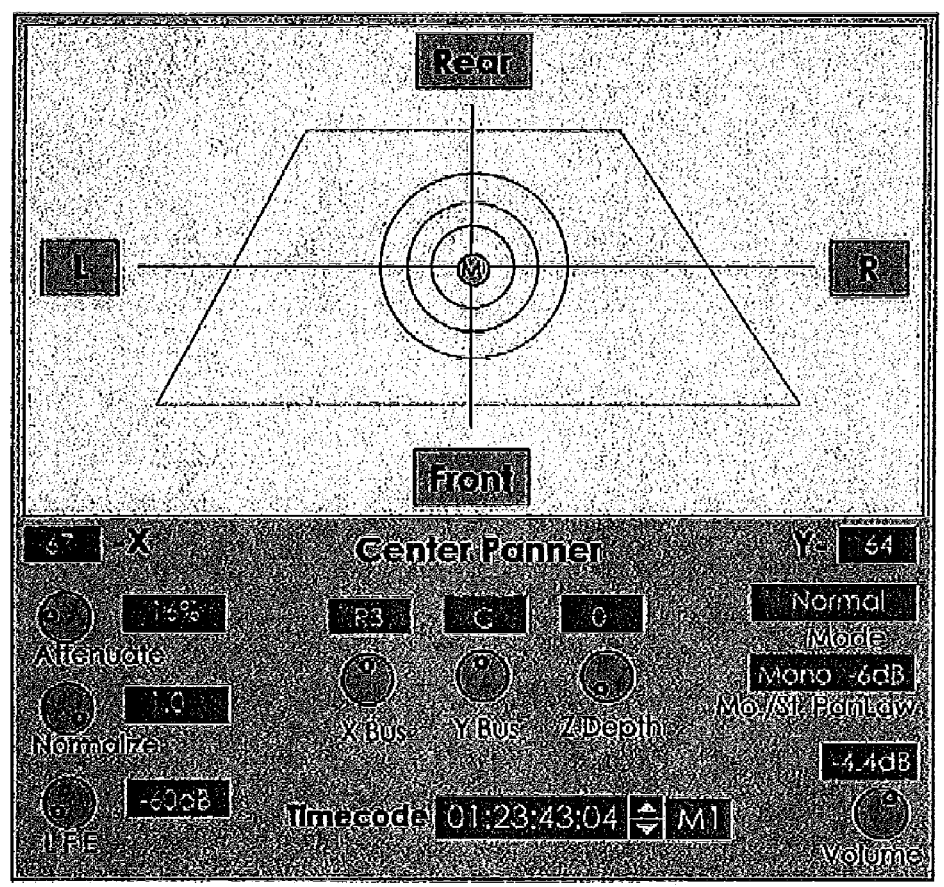
FIG. 11 is a view illustrating a common mode of a plug-in type authoring tool.
Figure 12:
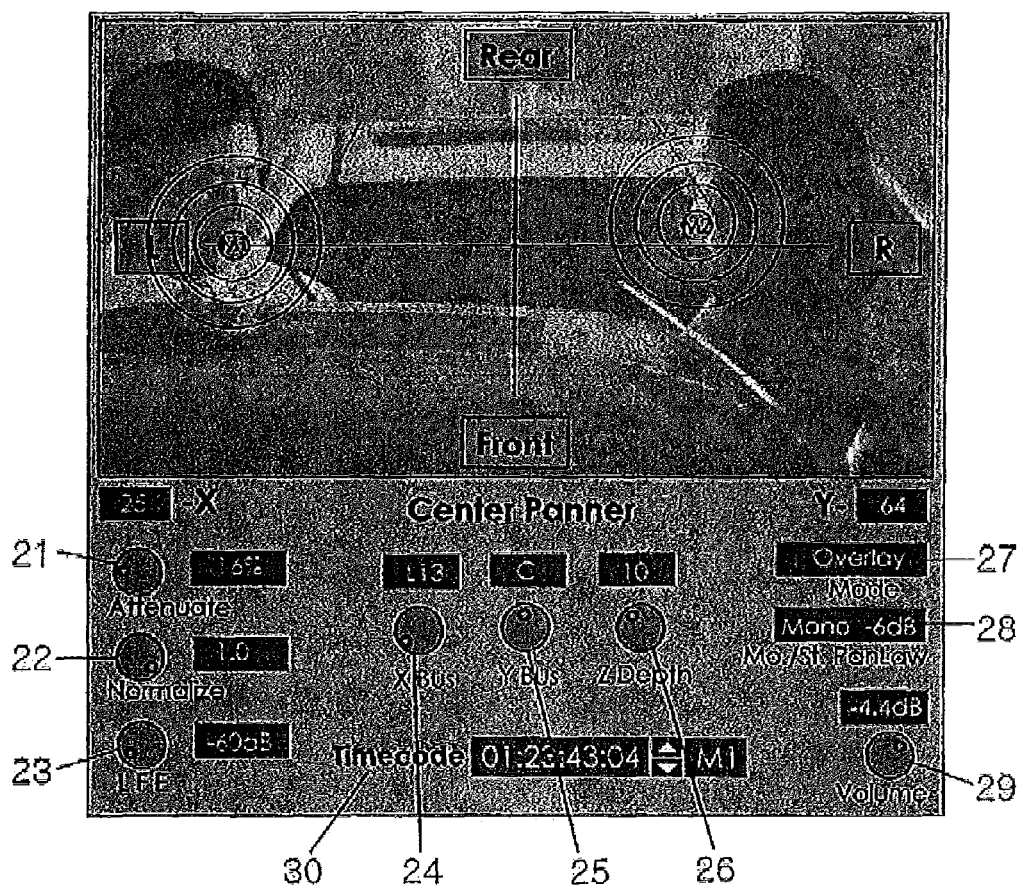
FIG. 12 is a view illustrating an overlay mode of a plug-in type authoring tool.

FIG. 10 is a view of an example that a result of the work performed in the authoring tool of FIG. 8 is stored in a recording medium. FIG. 11 is a view of a common mode of a plug-in type authoring tool. FIG. 12 is a view of an overlay mode of a plug-in type authoring tool.

The procedure for performing an authoring tool in a plug-in type in the overlay mode of FIG. 12 will be described.

*Screen Arrangement

The size of the screen is automatically determined based on a set aspect ratio. On the screen, the left and right sides are set as X, and the upper and lower sides are set as Y. The depth corresponding to the forward and backward sides is set as Z. In case that MIDI is used, a corresponding value can be indicated as 1 through 128. In case of X and Y bus, the intermediate value is indicated as C, and incase of Z, it is indicated as 0. In order to clarify it more efficiently, L/R, H/L and F/R can be indicated on the screen. These values can be selected by converting them into X bus, Y bus and Z depth. When a mouse moves or a parameter dial is rotated, a corresponding value is indicated.

*Source Indication and Attenuate Parameter

The position of a source is defined as a ball shape, and the attenuating value is defined in a form of an attenuate parameter 21. When the attenuate value is 100%, the sounds are outputted through the whole portions of the screen. When the attenuate value is 0%, the sound is outputted only through one speaker where a ball shape is positioned. The attenuate can be shaped a spiral shape along which sound lever gradually decreases. The sound can gradually decrease in an order of −3 dB, −6 dB and −12 dB depending on its spiral line, so a more practical attenuate effect can be obtained.

Far and Near Feeling Indication of Sound

A diamond shape is formed on the screen. It can change freely by dragging one side line of the same. This side line can be defined as a X depth parameter in order to indicate a far and near effect of sound. Namely, it is possible to make a far and near feeling of sound, so a movie viewer can recognize a far sound and a near sound on the same screen. The above parameter is defined so as to obtain a far and near effect. A ball shape corresponding to a source is selected, and the ball can be moved forward or backward by using a conversion key such as [Ctrl] on the keyboard.

*X and Y Indicators

It is possible to randomly express a position corresponding to the X and Y indicators 24 and 25 depending on the motion of a ball. A certain desired value can be directly inputted. When the sound source is fixed, a procedure can be faster finished.

*Normalize Parameter

The parameter 22 can be used for automatically normalizing the sounds depending on a given source. The loudness of sound can be adjusted by adjusting the above value.

*LFE Parameter

In case of a center channel, it is possible to make a more dynamic effect by transmitting a lower level sound of a center channel to a sub woofer for a special effect. The transmission of a lower level sound to a sub woofer can be determined by using the LFE (Low Frequency Effect) parameter.

*Mode Switch

A mode with respect to a center panner can be selected by using a mode switch 27. In case of the normal mode, the motion of a center image can be expressed in a surround type. In case of the overlay mode, the work can be conveniently performed by properly inserting the current work screen depending on a time code. A stereo mode, a dual mono mode, and a matrix speaker mode can be added.

*Mo. St. Pan Law Switch

This switch can be used so as to adjust left and right balances. The switch 28 can be used in the modes of –dB, –3 dB, –6 dB and Equal power. When it is positioned at –6 dB, when is inclined toward the leftward or rightward direction by assuming the standard at –dB in the mono position (right center), the sound level is automatically decreased as much as –6 dB. So, when a movie viewer watches sitting at the center of the screen, it is possible to maximize the most balanced sound effect in left and right sides.

*Volume Parameter

The whole output values with respect to the center channel can be adjusted. Even when the input level is small, the level can be amplified using the volume parameter 29. The normalize parameter can be used for making the lower level sound a higher level sound and for making the higher level sound a lower level sound, whereas the volume parameter can be used for increasing or decreasing the sound level based on the set values.

*Time Code and Same Source Conversion Switch

The current work can be checked with the helps of a time code leader portion. The time code 30 moves in the same method as the time code of a sequence. The portion of the time code is dragged if necessary, and a certain desired time can be typed, by means of which it is possible to directly move to a certain desired position. When multiple sources are used in the center channel, the source conversion switch allows a direct moving to another center channel track without opening an additional center panner.

When the work is performed in the overlay mode, a resultant data is shown in FIG. 10. The time code track 31 of the current screen and the screens of FIGS. 3 through 7 are arranged on the video track 32 by the time codes, and the sound source of the object is arranged in the center channel tracks M1 and M2 (33, 34) in sync with the screen, and the coordinate of the center channel is stored in the X bus track 35, the Y bus track 36 and the track of the Z depth 37, respectively, while matching with the words of the screen. A certain track might be added with respect to a Korean text 38 and an English text 39. In a preferred embodiment of the present invention, it is assumed that the center channel tracks are formed of M1 and M2, but the number of center channel tracks might increase when the sounds of the objects on one screen are set to output from multiple positions. For example, when the number of objects to be displayed on the monitor screen is 3, the number of the center channels is set as 3. When the object outputs sound sources at the same time, the sound source graph indications of the center channel track are outputted at the same time, and the coordinates on the screen of the object are stored in the X and Y bus tracks.

So, a word and an audio matching with the screen can be outputted from a corresponding speaker based on the match with the positions on the screen of the object.

The matrix speaker encoding method according to the present invention is compatible with a conventional surround sound authoring tool, and a parameter track with respect to a X-bus, a Y bus and a Z depth are added. The added tracks might be applied by using a text-based train text track or a residual audio track and an Aux track. At this time, a corresponding parameter is expressed as the values of X, Y and Z coordinates. The X, Y and X coordinates are parameters for expressing the left and right, upper and lower and depth (far and near feeling) in a 3D method while being precisely synchronized with the words of the screen. A more efficient authoring work can be possible by matching each parameter with the maximum number of the matrix speakers used. The most frequently used method is a method which applies the MIDI (Musical Instrument Digital Interface) by expressing the same in the numbers 1 through 128.

The finished data can be burnt on a media such as a DVD or a blueray or can be made in a form of an embedded audio file for the use in a web, a game, a broadcast, a movie or something.

Figure 13:
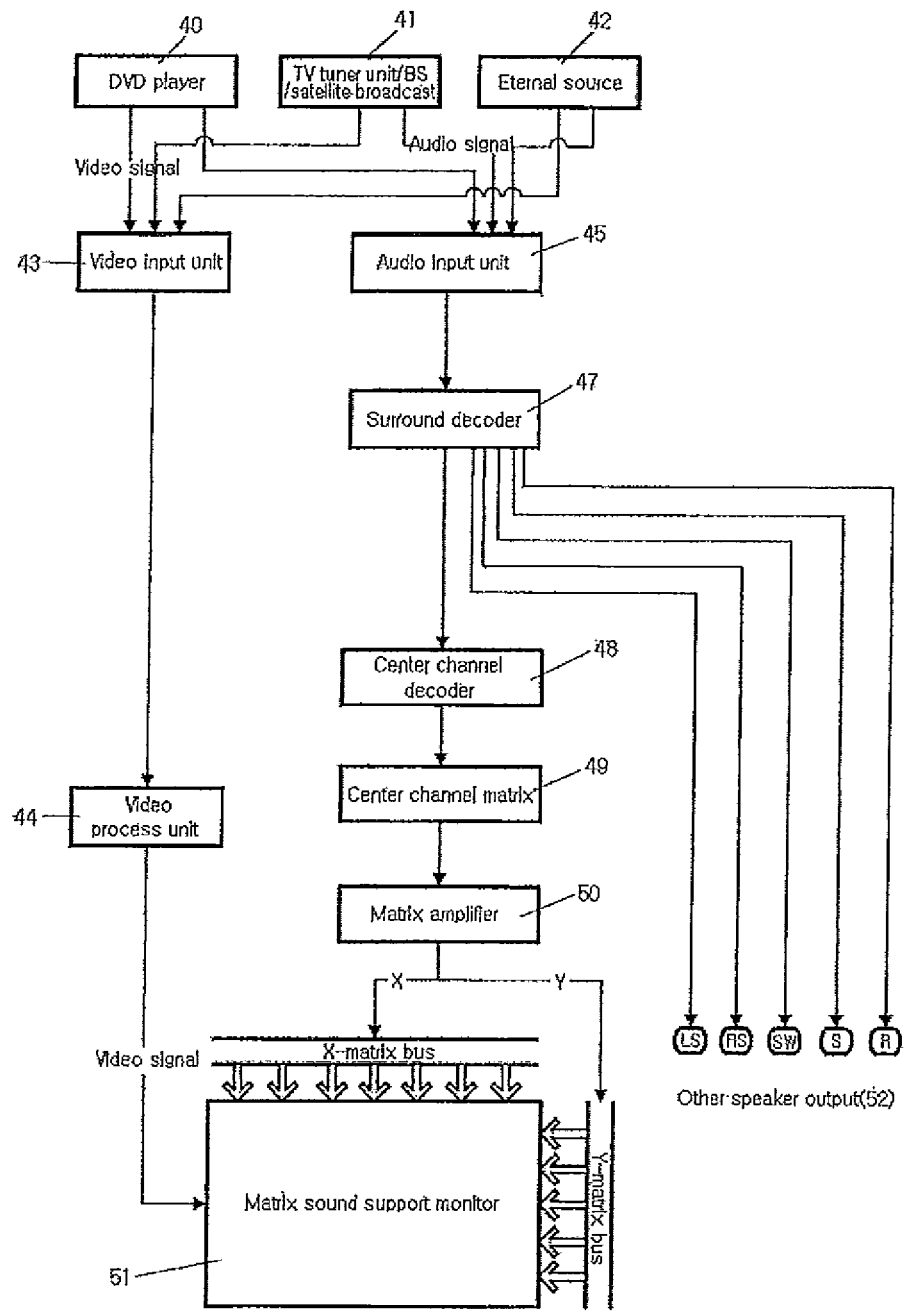
FIG. 13 is a block diagram illustrating a construction of a decoding apparatus according to the present invention.

FIG. 13 is a block diagram illustrating a construction of a decoding apparatus according to the present invention.

The video signal inputted from an external video instrument such as a DVD/Blueray player 40, a TV tuner/satellite broadcast 41 or something is inputted into the matrix sound support monitor 51 according to the present invention through the video input unit 43 and the video process unit 44 and is displayed on the same. The audio signal of a DVD/Bluray player 40, a TV tuner/satellite broadcast 41 and an external source 42 is inputted into a surround decoder 47 through the audio input unit 45. The sound source with respect to the center channel is transmitted from the surround decoder to the center channel decoder, and other sound sources are outputted to other speakers 52 of the speaker system. The center channel decoder 48 receives an audio corresponding to the center channel speaker among the audios outputted from the surround decoder of the surround speaker system and separates into sound sounds based on an object and transmits to the center channel matrix. The center channel matrix 49 sets the coordinates of the sound sources based on the objects separated by means of the center channel decoder, and the matrix amplifier 50 amplifies the sound sources of each set coordinate, and the amplified sound sources are outputted to the speakers corresponding to a corresponding coordinate through the X matrix bus and the Y matrix bus in sync with a video signal inputted into the matrix sound support monitor 51.

The words and sound corresponding to a corresponding object (person or thing) among the audio signals are outputted to the speakers of the matrix sound support monitor through the center channel decoder, but the other sounds are outputted to the other speakers 52 (front left and right speakers, subwoofer, surround left and right speakers, surround back speakers or something) through the surround decoder 12.

INDUSTRIAL APPLICABILITY

In the present invention, the encoded data according to the present invention are transmitted to the decoding apparatus through an outgoing port 20 of an authoring tool or are stored in a media recording medium such as a DVD, a blueray, a hard disk or something or are displayed on a display apparatus having an object-oriented 3D sound coordinate indication according to the present invention.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An encoding system for encoding audio using an authoring tool, the encoding system comprising:
   an X-Y-Z coordinate panner for inputting an X bus parameter and a Y bus parameter for setting X and Y coordinates, the X and Y coordinates corresponding to a speaker channel among a plurality of speaker channels which are arranged in a matrix shape behind a screen for a sound source of an object, and inputting a Z depth parameter for setting Z depth values indicating far and near effects of the object along with a Z axis; and
   a channel encoder for storing the X bus parameter, the Y bus parameter and the Z depth parameter which are inputted for the sound source of the object as data to output the data through an export of the authoring tool;
   the authoring tool providing an overlay mode for displaying positions of the sound source of the object on a video which is synchronized with the audio according to the X bus parameter and the Y bus parameter;
   the authoring tool marking the positions of the sound source of the object on the video which is synchronized with the audio according to the X bus parameter and the Y bus parameter using markers; and
   the authoring tool visually displaying shaped objects based on attenuation parameters, and controlling a number of the speaker channels for outputting the audio for an audio source of the object near the speaker channel corresponding to the position of the object, based on sizes of the shaped objects.

2. The encoding system of claim 1, wherein the shaped objects correspond to circles.

* * * * *